United States Patent [19]
Collins et al.

[11] Patent Number: 5,696,041
[45] Date of Patent: Dec. 9, 1997

[54] HIGH SOLIDS SILICON NITRIDE AQUEOUS SLURRIES

[75] Inventors: William T. Collins, Auburn; Lenny C. Sales, Grafton; Vimal K. Pujari, Northboro, all of Mass.

[73] Assignee: Saint-Gobain/Norton Industrial Ceramics Corp., Worcester, Mass.

[21] Appl. No.: 783,679

[22] Filed: Jan. 15, 1997

Related U.S. Application Data

[63] Continuation of Ser. No. 438,589, May 10, 1995, abandoned.

[51] Int. Cl.$^6$ ............................................. C04B 35/584
[52] U.S. Cl. ................................................ 501/97
[58] Field of Search ................................... 501/97

[56] References Cited

U.S. PATENT DOCUMENTS

| | | | |
|---|---|---|---|
| 4,904,411 | 2/1990 | Novich et al. | 501/97 X |
| 4,970,181 | 11/1990 | Pearson | 501/127 |
| 5,047,181 | 9/1991 | Occhionero et al. | 264/28 |
| 5,229,339 | 7/1993 | Pujari et al. | 501/97 X |
| 5,401,695 | 3/1995 | Wu | 501/97 X |

FOREIGN PATENT DOCUMENTS

| | | |
|---|---|---|
| 0 525 563 A2 | 2/1993 | European Pat. Off. . |
| 636596A1 | 7/1994 | European Pat. Off. . |

OTHER PUBLICATIONS

Chen et al. "Densification of nano–szied powders" in Proc. of the eighth annual conference on Fossil Energy materials, 1994, pp. 125–136 no month.

Peter Greil, Review: Colloidal Processing Of Silicon Nitride Ceramics, "Ceramic Materials & Components For Engines" pp. 319–329, Proceedings Of the Third International Symposium, Las Vegas, Nevada USA Nov. 27–30, 1988 no month.

E. Liden et al, Surface Modification and Dispersion Of Silicon Nitride and Silicon Carbide Powers, "Journal Of the European Ceramic Society 7", (1991) 361–368 no month.

Heinz Stadelmann et al, Effects Of Surface Purification On the Properties Of Aqueous Silicon Nitride Suspensions, "Journal Of the European Ceramic Society 5", (1989) 155–163 no month.

J.F.A.K. Kotte, Pressure Casting Of Silicon Nitride, "Journal Of The European Ceramic Society 7", (1991) 307–314 no month.

C. Olagnon et al, The Effect Of Slip Casting Parameters On the Sintering and Final Properties Of S13N4, "Br. Ceram. Trans. J. 88", (1989) 75–78 no month.

M. J. Crimp et al, Colloidal Behavior Of Silicon Carbide and Silicon Nitride, pp. 539–549 no month/no date.

Alwin Nagel et al, Rheology Of Aqueous Silicon Nitride Supensions, "Journal Of the European Ceramic Society 5", (1989) 371–378 no month.

*Primary Examiner*—Karl Group
*Attorney, Agent, or Firm*—Thomas M. DiMauro

[57] ABSTRACT

This invention is related to a flowable slurry comprising between 79 and 86 w/o silicon nitride solids.

2 Claims, No Drawings

5,696,041

HIGH SOLIDS SILICON NITRIDE AQUEOUS SLURRIES

This application is a continuation of application Ser. No. 08/438,589 filed on May 10, 1995 now abandoned.

BACKGROUND OF THE INVENTION

In manufacturing silicon nitride components having complex shapes, either pressure casting or injection molding is typically selected to form green bodies which are then fired to high density.

Injection molding involves heating a polymer or wax-ceramic dispersion to render it plastic and then injecting it inside a water-cooled metal mold. The injected plastic material conforms to the mold cavity shape and then cools. Advantages to injection molding include high green strengths, process yields and solids loadings, and a fast molding cycle. However, its disadvantages include its propensity to introduce metallic contamination to the part, long dewaxing times, cracking during dewaxing, low fired strength and limited cross sectional capability.

Pressure casting involves filtration of an aqueous ceramic powder suspension through a porous mold cavity. As the filtration proceeds, powder particles are deposited inside the mold cavity layer by layer thus forming the desired shape. Advantages to pressure casting include its ability to attain high green densities and fired strengths, its suitability for use in thick cross-section components, and its ability to be used without contaminating the suspension with metallic inclusions. However, its disadvantages include low casting rates, low solids loading, low green strength, low process yield, high labor requirements and significant density gradients resulting in dense part distortion.

Although each of these techniques produce reasonable yields for simple-shaped parts (i.e., between about 80% to 100% yield), neither has demonstrated similarly successful results in forming complex parts such as vanes and rotors. In fact, application of these techniques to produce complex parts have resulted in yields of only between about 15% and 50%.

It has been found that the main reason for the low yields are cracks in the parts generated during their green-forming stages (i.e., casting, demolding and drying).

Because the thickness of a complex shape varies over its cross section, it is expected that a part will cast (i.e., dewater and shrink) more quickly in its thinner areas and more slowly in its thicker areas. Unfortunately, these nonuniform drying and shrinkage rates cause differential stresses in the casting. If the variance in shrinkage is significant, the stress exceeds the component wet strength and the component cracks, usually in the concave portion of the part which is wet and weakest.

It has been hypothesized that this problem can be ameliorated by increasing the solids loading of the slurry. It is believed a high solids slurry will engender less shrinkage and thus lower the variance in the shrinkage rates.

Conventional silicon nitride slurries typically were found to possess a solids content of about 74 weight percent ("w/o"). Previous attempts to form higher solids slurries have been unsuccessful. In particular, it was found that when the solids content of silicon nitride slurries exceeded about 74 w/o, the slurry became extremely dilatant and ceased to flow (i.e., its viscosity was at least about 1000 cps).

Accordingly, it is the object of the present invention to provide a flowable, high solids silicon nitride slurry.

SUMMARY OF THE INVENTION

In accordance with the present invention, there is provided a high solids, flowable slurry and the high density, high strength green bodies attained therefrom. Preferably, the slurry comprises silicon nitride, has between about 79 w/o and 86 w/o solids, and has a viscosity of between about 150 and 500 cps, more preferably between about 300 cps and about 400 cps.

Also in accordance with the present invention, there is provided a process for making a high solids, flowable ceramic slurry comprising the step of:

a) adding ceramic particles (preferably silicon nitride) under high shear (preferably vibration) to a liquid (preferably water at a temperature of about 4 degrees C.) having a viscosity of at least about 1.2 cps.

DESCRIPTION OF THE PRESENT INVENTION

It has been found that raising both the viscosity of the liquid carrier and the shear under which ceramic particles are added to the liquid carrier provides the necessary environment to attain a stable, flowable, high solids slurry. This slurry can then be used advantageously to reduce the shrinkage and increase the strength of cast, complex green bodies.

Without wishing to be tied to a theory, it is believed that flowable, high solids slurries are attained because the higher viscosity of the liquid prevents it from being squeezed out from between colliding ceramic particles. The continued presence of the liquid helps lubricate the particles, thus lowering interparticle friction and the viscosity of the slurry, and raising its flowability. This occurs even though the viscosity of the liquid carrier is higher than that of the conventional liquid carrier (which is room temperature water having a viscosity of 1 cps). The increased violence of the high shear environment further improves the dispersion of the particles in the highly loaded suspension.

The ceramic particles of the present invention may comprise any ceramic powder commonly used in high performance ceramics, including silicon nitride and zirconia. If silicon nitride is selected, the particles may take any solid form, including a powder, a blend of powders forming a bimodal or trimodal distribution, or agglomerates. It has been found that broadening the particle size distribution of the ceramic powder leads to both higher solids loading in the slurry and to increased particle packing density in the cast body. Therefore, in preferred embodiments, the particle size distribution of the ceramic powder is broadened by agglomeration. In a first method of agglomeration ("the spray drying embodiment"), the milled slurry is spray dried and then calcined to form hard agglomerates which maintain their shape in the dispersed slurry. In a second method ("the reconstitution embodiment"), the milled slurry is spray dried, calcined, cast, dried, crushed, sized and reslurried. It has been found that the reconstituted powder provides the broadest particle size distribution.

Agglomerates can be made in any conventional manner, including casting followed by crushing; pan drying followed by crushing; and freeze drying followed by crushing. In an especially preferred embodiment, a trimodal silicon nitride powder containing 4 w/o yttria is milled to attain a surface area of about 8–12 $m^2/g$; the milled powder is then spray dried without binder, calcined at 600° C., reslurried in a high shear paint shaker to about 70–74 w/o solids, cast, air dried and then broken up to form agglomerates of 2–40 um.

Any method of inducing high shear within the slurry may be employed, as long as the high shear is at least about 50 times higher than the shear produced by conventional ball milling. Known methods creating high shear, such as vibration or attrition milling, are contemplated as being within the scope of the invention. If 4° C. water is used as the liquid carrier but the high shear environment is eliminated, it has been found that a flowable slurry having a solids content of about 83 w/o can be obtained, but it is so unstable so as to be commercially undesirable.

The liquid carrier of the present invention may be any liquid having a viscosity of at least 1.2 cps, preferably at least 1.4 cps. The enhanced viscosity (relative to conventional levels) provides sufficient lubrication of the ceramic particles to allow them to flow in a high solids environment. Preferably, the liquid carrier has a surface tension of no more than about 72 dynes/cm so that wetting and dispersability are not hindered. Typical liquids possessing at least one of these characteristics include water which has been chilled to between 2° C. and 5° C., preferably about 4° C. In one preferred embodiment, highly sheared, 4° C. water is attained by freezing water at 0° C. and then vibrating it. The vibration not only introduces shear, it also provides the necessary energy to warm the water to the desired 4° C. temperature.

If desired, other additives such as dispersants or sintering aids may be added to the liquid carrier either before, during or after the high solids slurry is attained. For example, conventional dispersants, such as DARVAN 821, may be added to the liquid prior to adding the ceramic particles in an amount of between 0.1 and 0.2 w/o of the ceramic particles. Likewise, sintering aids such as yttria, silica or magnesia may be added in an amount of between about 1 w/o and about 10 w/o (of the ceramic particle loading) without detrimental results. However, for calculation purposes, their added weight is considered to be part of the silicon nitride weight.

In preferred embodiments involving silicon nitride slurries, the slurry comprises between 79 w/o and 86 w/o solids, preferably between 82 w/o and 83 w/o, and is flowable. In preferred zirconia slurries, zirconia typically comprises at least 65 volume percent ("v/o") of the flowable slurry. Typically, the viscosity of the slurry is between about 150 cps and 500 cps, preferably between 300 and 400 cps.

Green bodies produced from the above-mentioned silicon nitride slurries of the present invention typically have a density of between 2.1 g/cc and 2.3 g/cc, or between 65% and 70% of theoretical density, and dry green strengths of between 0.6 MPa and about 6 MPa in diametric compression. They typically have a bimodal pore distribution, wherein a) the coarse pores are about 0.1 microns and the fine pores are about 0.02 microns, and b) the coarse pores comprise about 50 v/o and the fine pores comprise about 50 v/o of the green body.

In a first preferred embodiment of the present invention, there is provided a process comprising the steps of:

a) forming a first slurry comprising silicon nitride and a liquid carrier, b) agglomerating the first slurry to form agglomerates, c) calcining the agglomerates, d) adding the agglomerates under high shear to a liquid having a viscosity of at least about 1.2 cps to form a second slurry having a solids loading of between 79 w/o and 86 w/o solids, and e) slip casting the second slurry to produce a green body having a density of at least about 65% of theoretical density.

In a second preferred embodiment, the agglomerates are produced by spray-drying the first slurry of the first embodiment. It has been found that high solids (about 83–86 w/o) are generally achieved and a fairly strong green body (about 0.6 MPa) is generally produced by practicing this embodiment. However, it was also observed that some of the green bodies formed from slurry having less than 83 w/o solids cracked during drying. It is believed that the cracking in this second embodiment was due to drying shrinkage.

In a third embodiment, the agglomerates are produced by reconstituting crushed silicon nitride green bodies. Again, high solids (about 83–86 w/o) can be achieved and a strong green body can be produced by practicing this embodiment. However, it was again observed that some of the green bodies formed from slurry having less than 83 w/o solids cracked during drying.

In the fourth embodiment of the present invention, the first slurry is subjected to both cross-flow concentration (which results in a slurry having 70–74 w/o solids) and magnetic separation (which eliminates iron inclusions greater than 5 um).

In a fifth embodiment, the agglomerates are produced by pan drying the first slurry.

In a sixth embodiment, the agglomerates are produced by freeze drying, crushing and sizing the first slurry.

In a seventh embodiment of the present invention, the flowable, high solids slurry is gel cast. It has been found that gel casting the slurries of the present invention in accordance with U.S. Pat. No. 4,894,194 (the specification of which is incorporated by reference) results in high strength green bodies. This result is surprising in light of previous attempts to gel cast silicon nitride slurries with other gel systems. In particular, it is known that other gel systems (i.e., agarose) tended to displace silicon nitride in the slurry, thereby lowering the silicon nitride content of the slurry. By contrast, the gel system practiced in U.S. Pat. No. 4,894,194 not only did not displace silicon nitride when used with the high solids slurries of the present invention, it also helped produce green bodies having a green strength of at least 5 MPa. Since conventional green bodies have a green strength of about 0.6 MPa, the gel cast-green bodies of the present invention have impressive strength. In one preferred embodiment utilizing the technology disclosed in U.S. Pat. No. 4,894,194, suitable monomers are added to the carrier liquid prior to ceramic particle addition, and an appropriate initiator capable of creating a gel of the slurry upon contact with the monomers is added after the flowable, high solids slurry is attained. In more preferred embodiments, methylacrylamide and N,N' methylenebisacrylamide (the monomers) are added to water (the liquid carrier) in amounts of about 15 w/o and about 2.5 w/o of the water, respectively, and ammonium persulfate is added to the slurry in an amount of about 0.1 w/o of the water. Most preferably, a catalyst such as N,N,N',N'-tetramethylethylenediamine is also used in amount of about 0.1 w/o of the water.

In attempting to reliably produce green bodies from the high solids slurries of the present invention, it was observed that many of the green bodies contained significant voids. Since entrapped air often appears in the green body as a void, it was hypothesized that some of the slurries may contain significant amounts of air bubbles. Since air bubbles are often generated during the stirring of high solids slurries and during their transfer to molds, care must be taken not only to avoid air bubble generation during these steps but also to deair the slurry during its transfer. In one especially preferred embodiment of the present invention, deairing is accomplished by applying vacuum at or near 15–20" of mercury.

In the gel cast embodiments of the present invention, it has also been found that lower silicon nitride loadings (i.e, between 79 and 82 w/o solids) can be suitably used and high yields of crack-free green bodies can still be attained. Since air bubbles become a more problematic at higher loadings, these lower solids loadings may provide an advantage in that their successful deairing is more likely.

EXAMPLE I 96 w/o silicon nitride powder (consisting of 50% E03, 30% E05 and 20% E10, each available from Ube Industries of NY, N.Y.) and 4 w/o yttria are mixed together. This mixed is then milled to achieve a surface area of between 8 and 10 $m^2/g$. The milled powder is spray dried (without binder addition) and calcined at 600° C. The calcined powder is then slurried in deionized water containing a suitable surfactant under high shear provided by a shaker. When the slurry is about 74 w/o solids, it is cast. The cast body is then dried and crushed to from agglomerates having a size range of about 2–50 um.

The silicon nitride agglomerates are then mixed with deionized water containing about 1–2 w/o of a suitable surfactant to produce a slurry having about 74 w/o solids. This slurry is then chilled to about 0° C. Once this temperature is attained, the liquid is allowed to thaw to about 4° C.

As the liquid is thawing to the desired temperature, high shear is introduced by adding ½" silicon nitride milling media (in an amount of about one-fifth the volume percent of the slurry) to the liquid and shaking the liquid with a high energy paint shaker.

When the temperature of the liquid reaches 4° C. and the liquid is under high shear, additional silicon nitride agglomerates are slowly introduced into the liquid at a rate of about 0.08 weight percent per minute until the slurry attains a solids content of between about 83 w/o and about 84 w/o.

After the desired solids content is reached, the slurry is mixed at about 4° C. for an additional 24–36 hours, and then filtered through an 80 um screen to remove large undesirable agglomerates. The measured viscosity of this filtered slurry at 4° C. was found to be about 500 cps. This slurry was pourable and had the consistency of a milkshake.

The high solids slurry was then poured into a non-porous mold and frozen at −80° C. It was then freeze-dried to form a green body having a green strength of about 6 MPa.

We claim:

1. An aqueous, flowable slurry comprising ceramic particles and water, the water being under high shear, having a temperature of between 2° and 5° C., and having a viscosity of at least 150 cps, wherein the amount of ceramic particles comprise between about 79 w/o and 86 w/o of the slurry and consist essentially of silicon nitride.

2. The slurry of claim 1 having a viscosity of between 150 and 500 cps.

* * * * *